Aug. 28, 1951     C. A. MARTIN     2,565,510

DUST COLLECTOR FOR TILE CUTTING MACHINES AND THE LIKE

Filed Nov. 29, 1947     6 Sheets-Sheet 1

INVENTOR.
Charles A. Martin
BY Popp & Popp
Attorneys.

Aug. 28, 1951  C. A. MARTIN  2,565,510
DUST COLLECTOR FOR TILE CUTTING MACHINES AND THE LIKE
Filed Nov. 29, 1947  6 Sheets-Sheet 2

INVENTOR.
Charles A. Martin
BY Popp & Popp
Attorneys.

Aug. 28, 1951  C. A. MARTIN  2,565,510
DUST COLLECTOR FOR TILE CUTTING MACHINES AND THE LIKE
Filed Nov. 29, 1947  6 Sheets-Sheet 3
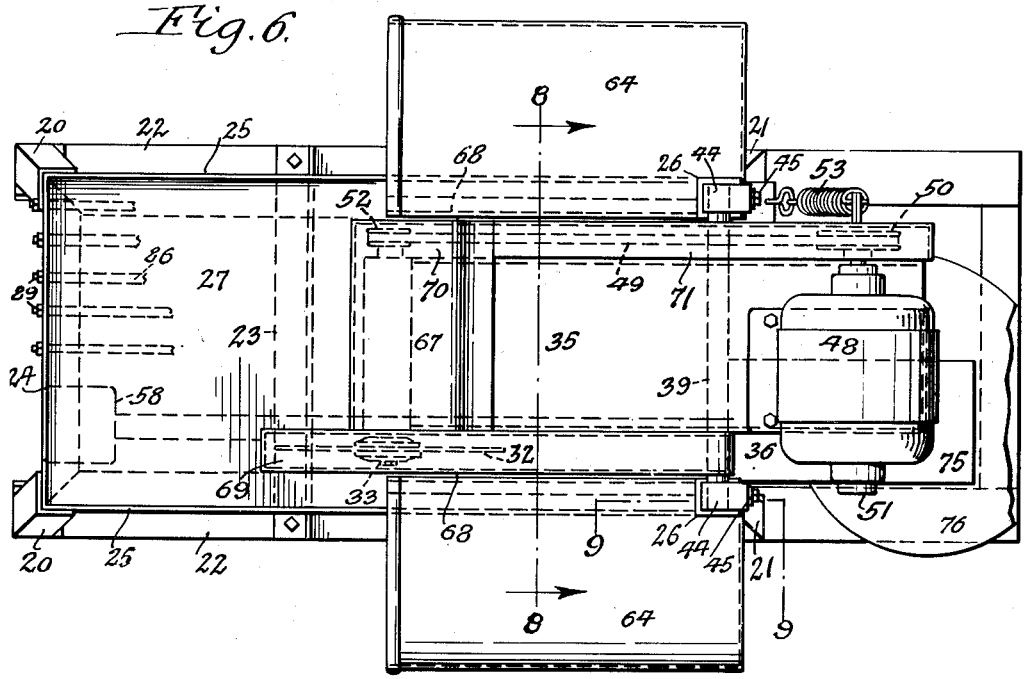
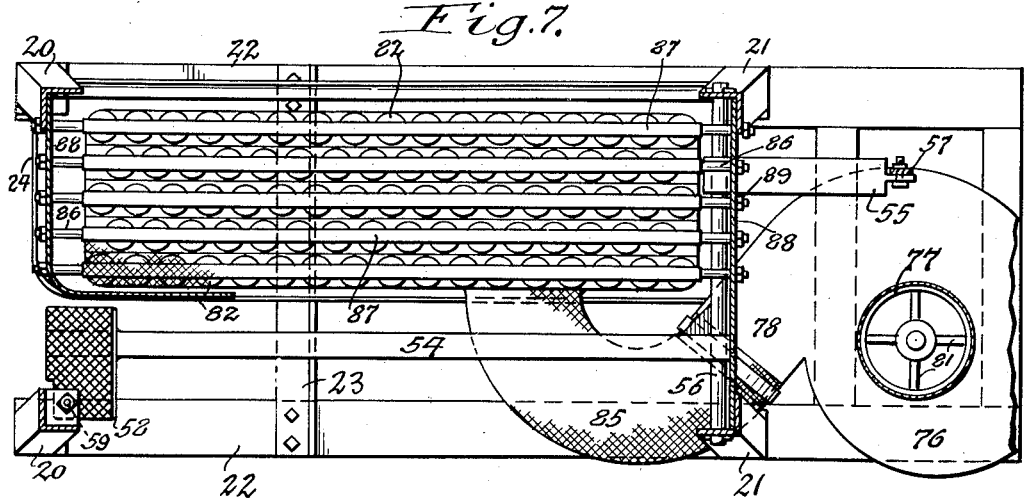
INVENTOR.
Charles A. Martin
BY Topp + Topp
Attorneys.

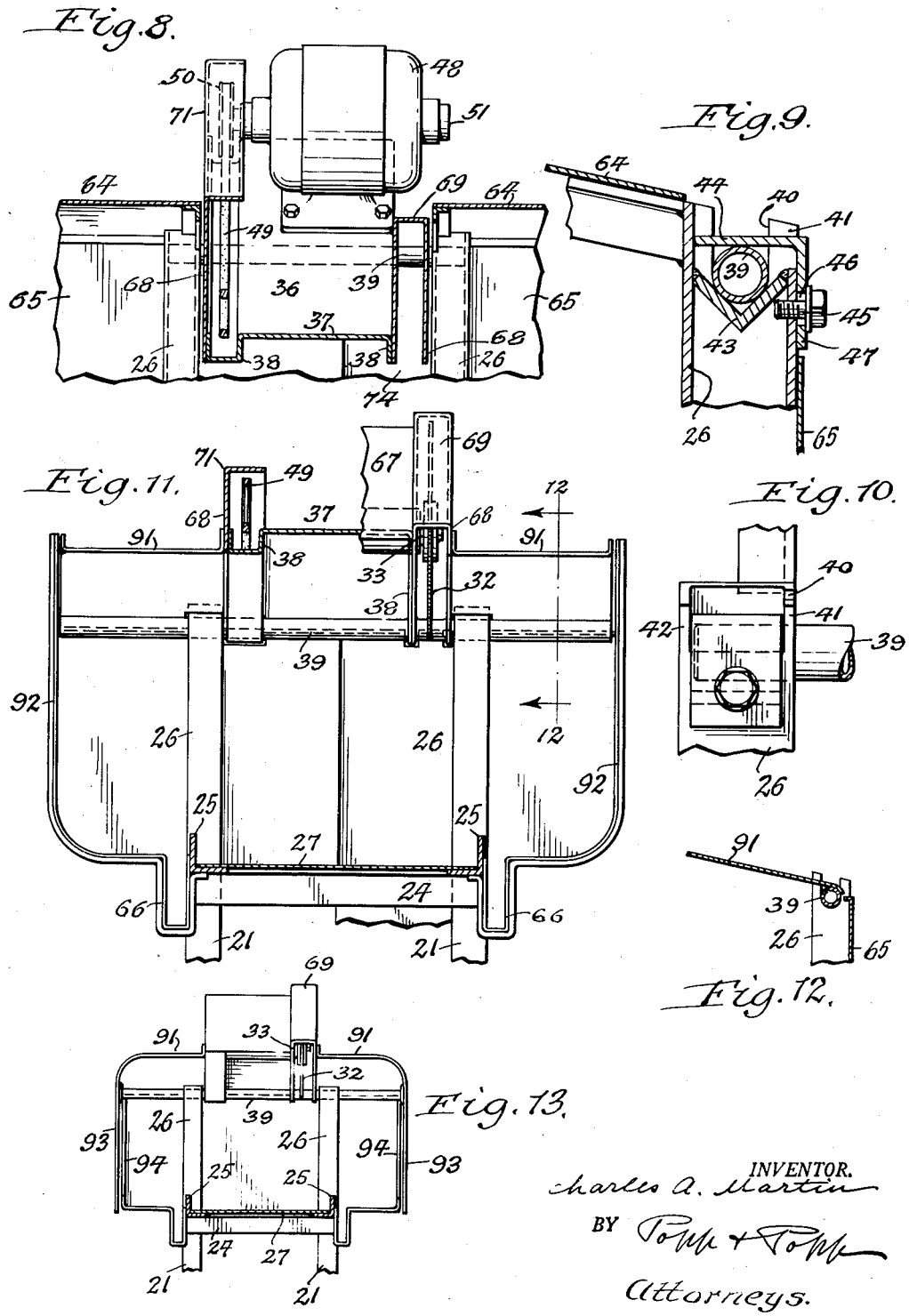

Aug. 28, 1951 C. A. MARTIN 2,565,510
DUST COLLECTOR FOR TILE CUTTING MACHINES AND THE LIKE
Filed Nov. 29, 1947 6 Sheets-Sheet 5
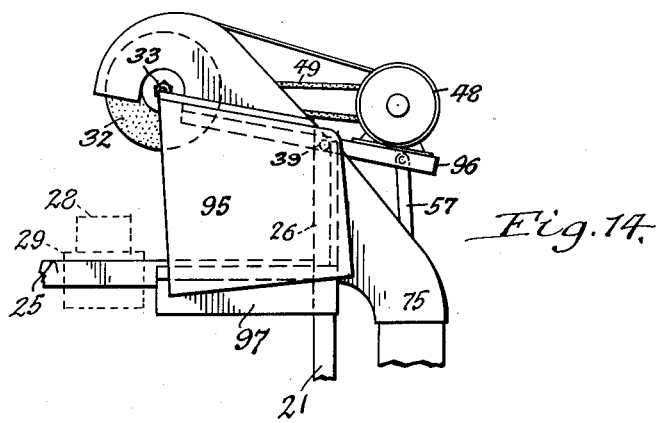
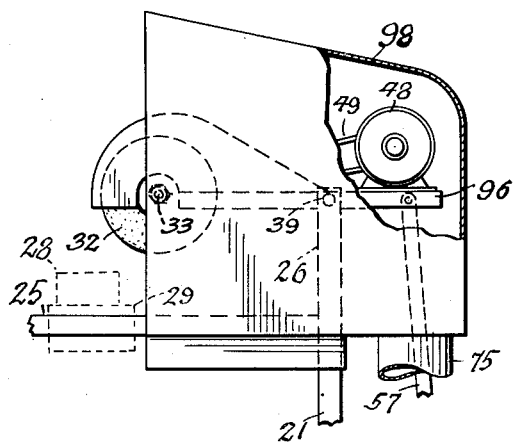 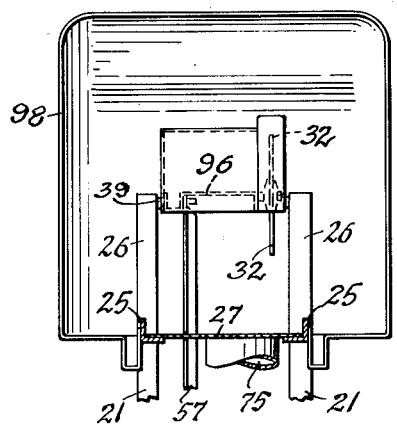
Charles A. Martin INVENTOR.
BY Popp & Popp
Attorneys.

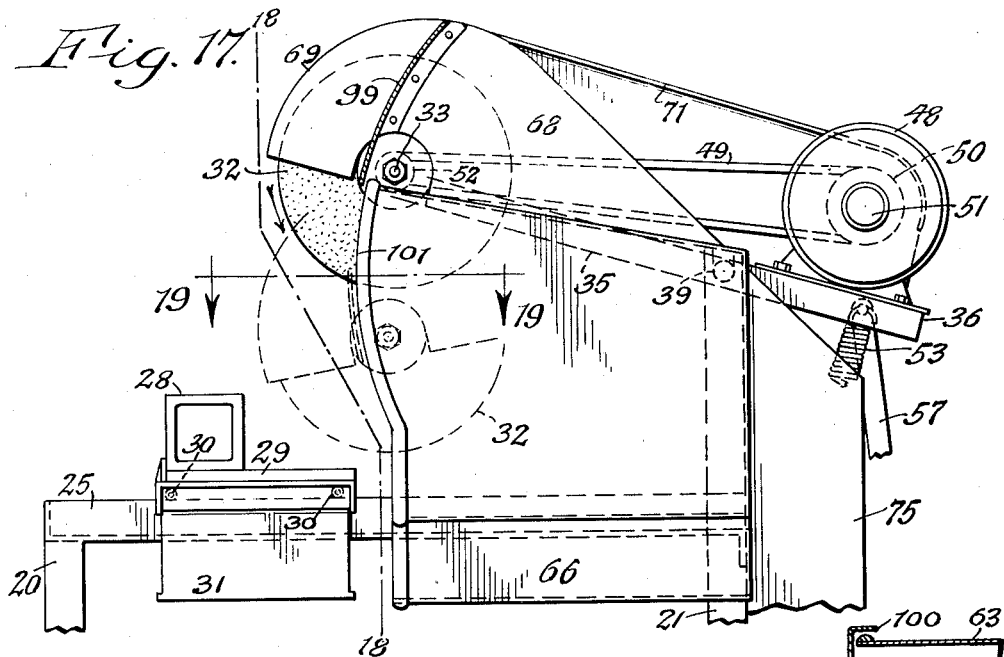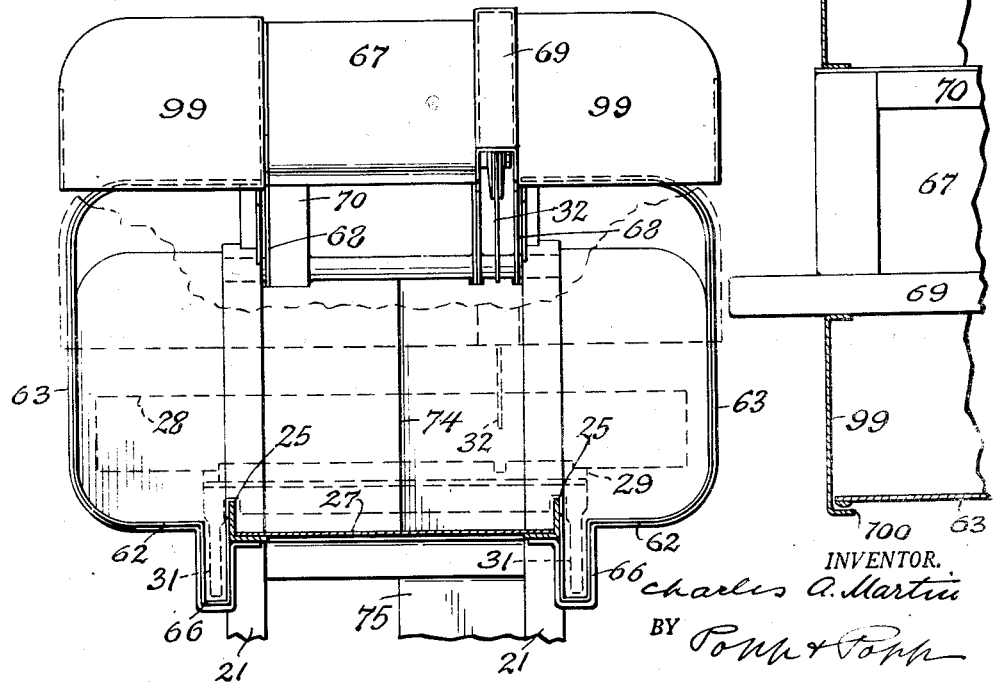

Patented Aug. 28, 1951

2,565,510

UNITED STATES PATENT OFFICE 2,565,510

DUST COLLECTOR FOR TILE CUTTING MACHINES AND THE LIKE

Charles A. Martin, Buffalo, N. Y.

Application November 29, 1947, Serial No. 788,938

6 Claims. (Cl. 51—273)

This invention relates to a dust collector which is more particularly intended for use in connection with machines for cutting building tile, brick, or other ceramic products produced from clay, and used in building construction. It may, however, be used with other machines which present similar conditions.

During the cutting of these type materials, large amounts of injurious dust is produced. This dust is breathed by the workmen, resulting in a hazard to their health. The dust is carried in the air, and spread over substantial areas, causing damage to same.

The principal object of this invention is to provide, for use with cutting machines that generate deleterious dust during their operation, a durable and simple dust-collecting apparatus that is not liable to get out of order, yet will promptly and efficiently remove said dust, and which also provides the maximum visibility for the operator and enables him to accurately cut an article in accordance with scribe marks which have been placed thereon to suit some particular work which is being done.

In the accompanying drawings:

Fig. 6 is a top plan view of the apparatus shown in Figs. 1 and 3.

Fig. 7 is a horizontal section taken on line 7—7, Fig. 1, looking downwardly.

Fig. 8 is a fragmentary vertical transverse section taken on line 8—8, Fig. 6.

Fig. 9 is a fragmentary vertical longitudinal section, on an enlarged scale, taken on line 9—9, Fig. 6.

Fig. 10 is a rear elevation of the parts shown in Fig. 9.

Fig. 11 is fragmentarry vertical transverse section, similar to Figs. 3 and 8, showing a modified construction of this invention.

Fig. 12 is a fragmentary vertical longitudinal section taken on line 12—12, Fig. 11.

Fig. 13 is a fragmentary vertical cross section similar to Figs. 3 and 11, showing another modification of this invention.

Fig. 14 is a side elevation of the construction shown in Fig. 12.

Fig. 15 is a fragmentary side elevation, similar to Figs. 1 and 14, showing a still further modification of an apparatus embodying this invention.

Fig. 16 is a front elevation of the apparatus shown in Fig. 15.

Fig. 17 is a fragmentary side elevation of an article cutting machine which is equipped with a further modification of this invention whereby the suction effect upon the dust laden air is increased as the cutting device moves toward the article to be cut and decreases this suction effect as the cutting device recedes from this article.

Fig. 18 is a fragmentary vertical transverse section taken on line 18—18, Fig. 17.

Fig. 19 is a fragmentary horizontal section taken on line 19—19, Fig. 17.

In the following description like reference characters indicate similar parts in the several views of the drawings.

Figure 1:
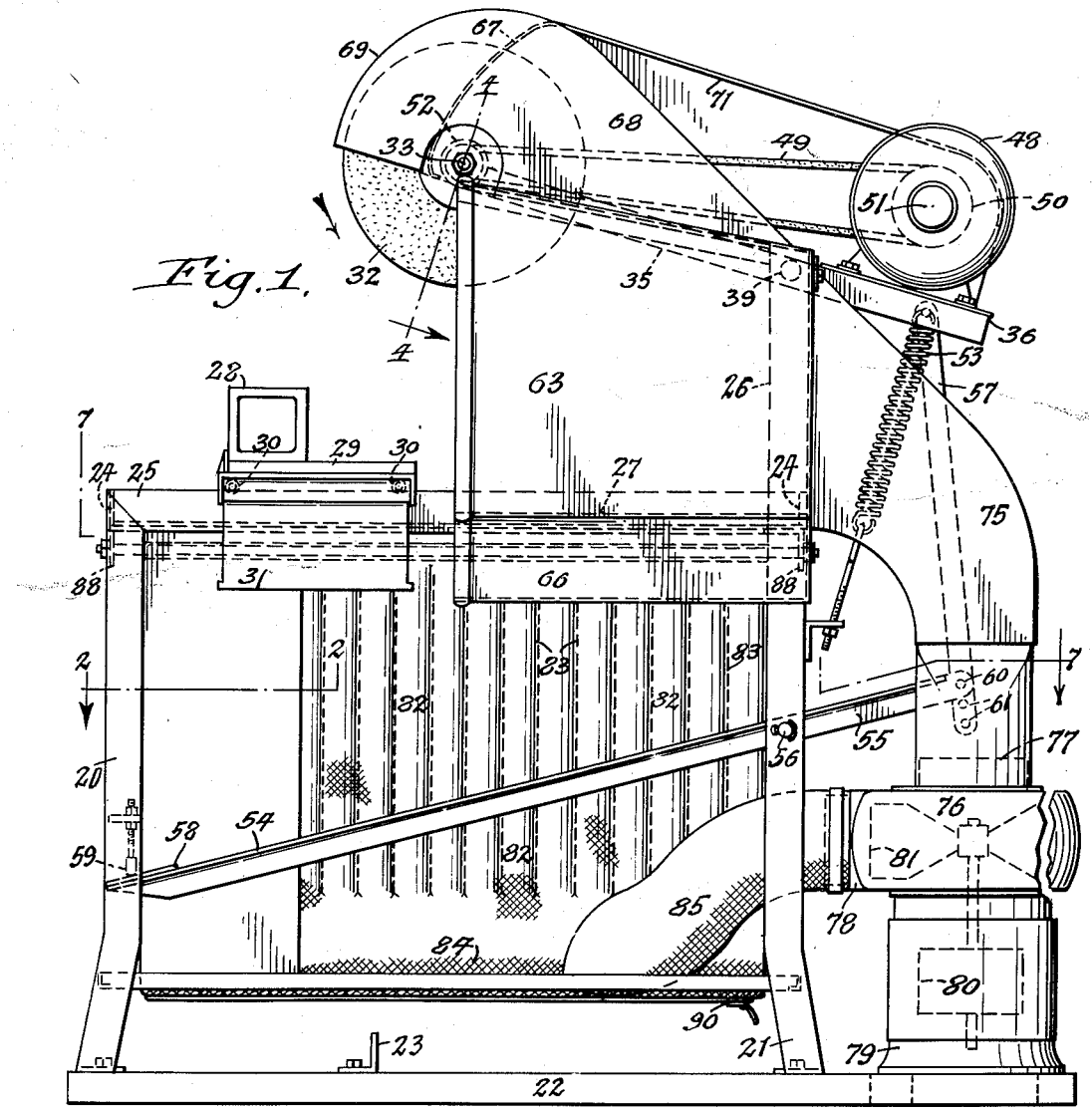
Fig. 1 is a side elevation of one form of dust collector embodying this invention and associated with a machine for cutting building tile.
Figure 2:
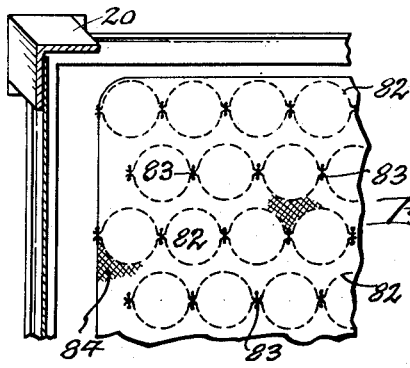
Fig. 2 is a fragmentary horizontal section taken on line 2—2, Fig. 1.

Although this invention may be advantageously employed in connection with different apparatus for collecting dust which is produced by the same, that shown in the drawing, as an example, is designed more particularly for cutting building tile and is constructed as follows:

The main frame of this tile cutting machine may be of any suitable construction and comprises upright front legs 20 which are spaced transversely from each other, upright rear legs 21 spaced transversely from each other and also from the respective front legs in a direction lengthwise of the machine, skids 22 connecting the lower ends of these legs and resting on the floor of the building or on the ground, a lower cross bar 23 connecting the lower longitudinal skids, upper front and rear cross bars 24 connecting the upper ends of the front and rear legs, respectively, two upper longitudinal parallel bars 25 which connect the upper front and rear cross bars 24 and also serve as guide rails of a track upon which the work piece to be cut is movably mounted, and two standards or posts 26 extending upwardly from the rear legs 21, as best shown in Figs. 1, 2, 3 and 6. Across the space between rails 25 and the upper cross bars 24, a horizontal pan or plate 27 of sheet material extends which is mounted in any suitable manner on these frame members.

The building tile or work piece 28 is moved horizontally back and forth lengthwise of the machine during the operation of cutting the tile by means of a carriage which may be of any suitable construction but preferably comprises a table 29 upon which the tile is supported, rollers or guides 30 mounted on the underside of the table and running on the rails 25, and wings 31 projecting downwardly from opposite longitudinal edges of the table and along the outer sides of these rails and forming part of means whereby the table may be adjusted vertically in accordance with the mechanism shown in United States Letters Patent No. 2,213,011.

As the tile or work piece is moved lengthwise of the machine the same is engaged by a cutting tool 32 consisting preferably of a rotary blade or disk of abrasive material which is rotatable about a horizontal transverse axis and is moved vertically bodily toward and from the path of the work piece. In the preferred construction this cutting disk is mounted on one end of a transverse cutter shaft 33 which is journaled in bearing means 34 arranged at the front end of the front arm 35 of a rock lever or beam which is pivoted between its front and rear ends on the upper ends of the standards so that its front arm 35 projects forwardly from the axis and its rear arm 36 projects rearwardly therefrom, as shown in Figs. 1-5. The body of this lever or beam is preferably constructed in the form of a flat plate 37 which is provided at its opposite longitudinal edges with downwardly projecting longitudinal flanges 38, thereby forming a light and strong structure.

Various means may be provided for pivotally mounting this rock lever on the frame, those shown in the drawings being preferred and comprising a transverse rock shaft 39 extending through the flanges 38 of the rock lever and secured with its central part thereto and also extending through upwardly opening notches 40 at the upper ends of the inner flanges 41 of the standards 26, as shown in Fig. 9, and the ends of said shaft engaging the outer flanges 42 of said standards, as shown in Fig. 10, thereby holding said shaft against movement lengthwise of its axis.

Adjacent to each of its ends the rock shaft is journaled on the respective standard by bearing means which comprise a lower fixed V-shaped bearing saddle 43, engaging with the under side of the rock shaft, as shown in Fig. 10. The shaft is retained in engagement with this bearing saddle by the upper horizontal wing 44 of an angular clip which is detachably connected with the inner flange 41 of the respective standard by a bolt 45 passing through a vertical slot 46, in the vertical wing 47 of said retaining clip and engaging its threaded inner end with a threaded opening in the respective standard flange 41 while its headed outer end bears against the vertical wing 47 of the clip, as shown in Fig. 9. By this means the rock shaft 39 can be readily mounted on the frame when assembling the machine and also dismounted for repairing and inspection.

Figure 4:
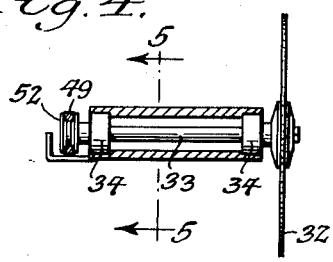
Fig. 4 is a fragmentary vertical transverse section taken on line 4—4, Fig. 1.

Rotation of the cutting disk may be effected in various ways but preferably by means of an electric motor 48 mounted on the rear arm 36 of the rock lever and a belt 49 passing around a driving pulley 50 on one end of the motor shaft 51 and a driven pulley 52 on that end of the cutter shaft 33 opposite to the one carrying the cutting disk 32, as shown in Figs. 1, 4 and 6.

When the cutting disk is not in use the same is raised out of the path of the work piece and this is accomplished by a spring 53 connected at its upper end to the rear arm 36 of the rock lever and at its lower end to the adjacent rear part of the main frame, as shown in Figs. 1 and 6. This spring not only holds the cutter disk yieldingly in its inoperative elevated position when the same is free, but it also serves to balance weight of the rock lever and the parts mounted thereon so as to relieve the workman of undue effort when operating the machine.

Downward movement of the cutting disk for bringing its lower portion into the path of the work piece to be cut is effected by an operating or treadle lever which is arranged lengthwise of the lower part of the main frame on one side of the center thereof and is pivoted between its front and rear arms 54, 55 on the rear legs 21 of the main frame by a transverse pivot rod 56 and has its rear arm connected by a link 57 with the rear arm 36 of the cutter and motor supporting rock lever. At its front end the front arm of the treadle lever is provided with a pedal 58 which is adapted to be engaged by the foot of the operator for depressing this arm and thus elevating the rear arm thereof and thereby turning the rock lever 35, 36 so as to lower the cutting disk into operative position relative to the work piece. The upward movement of the front arm of the treadle lever is limited by a stop consisting preferably of a rubber bumper 59 which is mounted on the adjacent part of the main frame, as shown in Fig. 1.

For the purpose of adjusting the throw of the rocking cutter lever and the disk to compensate for wear on the latter and also the height of the work piece which is being cut, the rear arm 55 of the treadle lever and the lower end of the link 57 are adjustably connected, preferably by a bolt 60 passing through an opening in the arm 55 and through one or another of a vertical row of openings 61 in the lower part of this link, as shown in Fig. 1.

During the operation of cutting tile and the like by the disk or blade 32 dust is produced which is liable to affect the health of the operator and also coat surfaces adjacent to the cutting apparatus and means are therefore provided for removing the dust and collecting the same and thus render the operation of the cutting machine unobjectionable.

The form of the dust removing and collecting means embodying this invention, as shown in Figs. 1-9, is constructed as follows:

Below the cutting disk or tool and its supporting means is arranged a suction chamber which is subject to an exhausting effect whereby the dust produced by engagement of this disk with the tile that is presented thereto will be carried away and thus prevent this dust from spreading in the adjacent area and polluting the air and thereby avoid covering the adjacent parts with dust as well as rendering the conditions around the cutting machine more healthy.

This suction chamber may be variously shaped but the same is preferably formed within an enclosure which comprises a horizontal bottom wall of which the rear part of the plate 27 between the rails 25 forms the central section and two horizontal wall parts 62 mounted on the adjacent part of the main frame along opposite longitudinal edges of this wall plate 27 form the side bottom sections, two upright longitudinal side walls 63 projecting upwardly from the opposite longitudinal edges of the side bottom sections 62, two top wall sections 64 projecting horizontally inward from the upper edges of the side wall sections 63 and having their inner edges spaced from each other, and an upright transverse rear wall 65 connected with the rear edges of the bottom sections 27, 62, the side wall sections 63 and the top sections 64. In this form of the suction chamber the same is open across its entire front side so as to provide a passage through which the tile or work piece and its carriage move rearwardly into this chamber and forwardly out of the same during the operation of cutting the tile or the like and the gap between the inner edges of the top section 64 provides a passage through which the cutter disk and its support move vertically into and out of the path of the work piece for effecting a cutting operation on the work piece.

Figure 3:
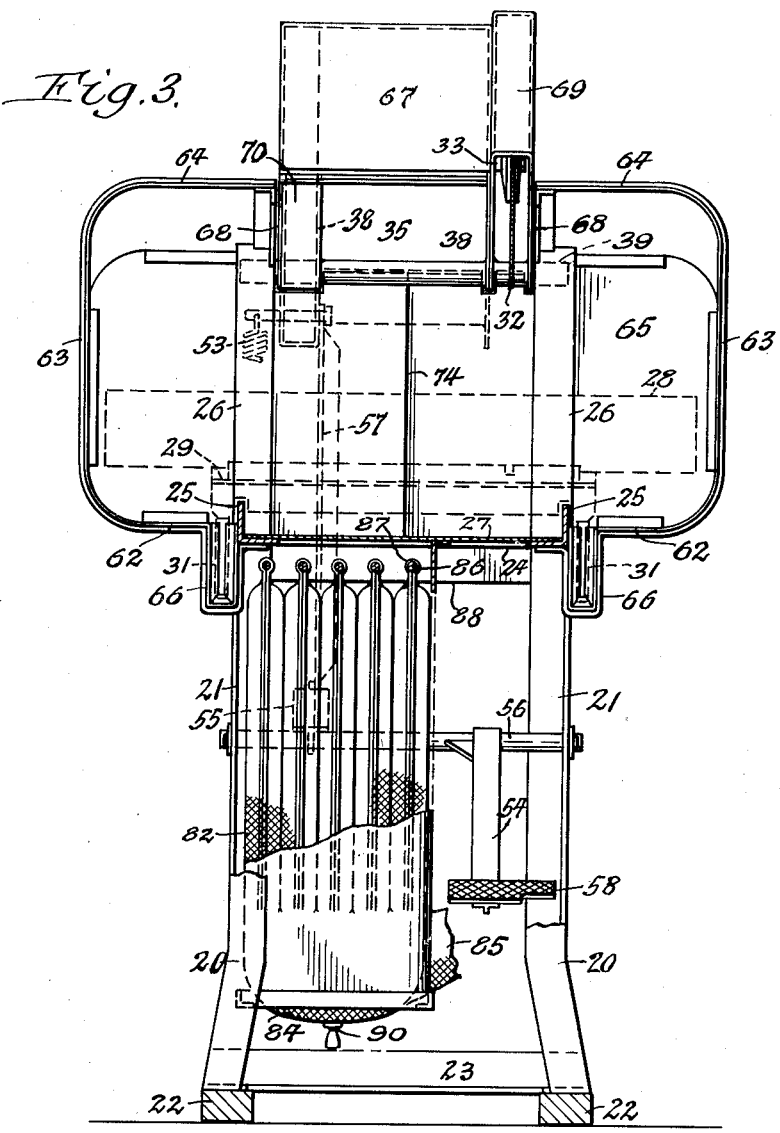
Fig. 3 is a front elevation of the apparatus shown in Fig. 1 with parts broken away.

For the purpose of permitting the depending side wings 31 of tile supporting carriage to move with the latter into and out of the suction chamber the bottom of the latter is provided with two longitudinal clearance wells or channels 66, each of which projects downwardly from one of the longitudinal edges of the central bottom section 27 and the corresponding edge of the adjacent side bottom section 62 and thus provide a passage for the respective carriage wing 31, as shown in Figs. 1 and 3.

In order to render the top of the suction chamber sufficiently air tight to permit the cutter and its support to move vertically therein into and out of its operative position and still substantially concentrate the admission of air under suction to the open front or air inlet of the suction chamber for most effectively removing the dust which is produced during the cutting operation, the cutting disk and the rock arm supporting the same are covered by an enclosure which moves vertically through the top opening of the suction chamber and a seal is provided between this enclosure and the suction chamber so as to prevent any material leakage of air through the joint between the enclosure and this chamber for the purpose of substantially confining the admission of air to the suction chamber at the open front thereof.

This is preferably accomplished by means of a hood which is mounted on the cutter rock lever and comprises a main body or top 67 extending transversely over the cutting disk and the front arm of the cutter rock lever and two vertical sealing walls or shutters 68 projecting downwardly from opposite longitudinal edges of the enclosure body 67 and adapted to move vertically close to the adjacent inner longitudinal edges of the chamber top sections 64 so as to practically seal the joints between the same and still permit the hood to ascend and descend freely. Adjacent to the cutter shaft 33 and its bearings on the cutter rock lever this hood is built close to these parts but adjacent to the cutter the same is enlarged to allow for the increased size of the cutter, as shown at 69 in Figs. 3 and 6, and adjacent to the driven pulley 52 and the front part of the belt 49 passing around the same this hood is extended laterally to cover these parts, as shown at 70 in Figs. 3 and 6. This top 67 is also provided with a rearward extension 71 which serves as a guard for the driving belt 49, as shown in Figs. 1 and 6.

Figure 5:
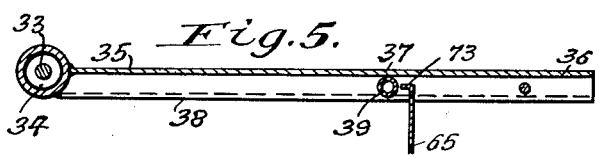
Fig. 5 is a fragmentary vertical longitudinal section taken on line 5—5, Fig. 4.

In this organization the front arm 35 of the cutter rock lever which carries the cutter disk moves vertically in the suction chamber and the rear arm 36 thereof which carries the motor 48 is arranged outside of this chamber and the upper edge 73 of the rear wall 65 is arranged close to the rod 39 which pivotally connects the cutter rock lever with the main frame, as shown in Fig. 5, thereby permitting this lever to rock freely without appreciable leakage of air at this place from the external atmosphere into the suction chamber.

An exhausting effect is produced on the space within the suction chamber for withdrawing dust laden air therefrom by exhausting means which may be of any suitable form but the means for this purpose shown in Figs. 1, 3, 6, 7 and 8 are constructed as follows:

The numeral 74 represents an outlet opening formed in the rear wall 65 of the suction chamber on one side of its center and 75 represents a suction conduit or pipe arranged vertically in rear of the suction chamber and communicating at its upper end with said outlet. The suction pipe 75 and the link 57 of the cutter rocking mechanism are arranged transversely on opposite sides of the center of the machine and thus produce a compact structure which is capable of being used advantageously when a limited space is available.

The numeral 76 represents the casing of an exhausting fan arranged with its axis vertically in rear of the lower part of the main frame and having its central inlet eye 77 arranged on the upper side thereof and connected with the lower end of the suction pipe 75 and having its outlet 78 at the periphery thereof projecting forwardly, as shown in Figs. 1 and 7. This casing is supported by a pedestal 79 which rests on the rear part of the main frame and contains a motor 80, preferably of the electric type, whereby the blades 81 of the fan within the casing are rotated to draw dust laden air from the suction chamber into the center of the fan casing and discharge the same through the peripheral outlet thereof. By arranging the fan with its axis vertically it is possible to connect the eye of the same with the suction pipe 75 without making an abrupt turn in the latter, thereby enabling an effective suction to be obtained without undue expenditure of power.

Means are provided for separating the dust from the air and collecting the dust and permitting the dust free air to escape to the atmosphere, suitable means for this purpose being shown in Figs. 1, 2, 3, 6 and 7, and constructed as follows:

The numeral 82 represents a plurality of upright dust filtering or separating tubes of sieve or screen-like material arranged in longitudinal rows within the main frame below the tile cutting mechanism and each row being preferably formed between two sheets of loosely woven textile material by sewing these sheets together at intervals by vertical rows of stitches 83. The lower parts of these screen sheets are not stitched together and form a manifold 84 which receives the dust laden air from the outlet of the fan through a delivery tube 85 and distributes it upwardly into the several separating tubes 82 from the lower ends thereof, as shown in Fig. 1. Each row of separating tubes is preferably supported by a longitudinal rod 86 passing through loops 87 arranged on the upper ends of a row of separating tubes and each of these rods being detachably mounted on the main frame by passing its front and rear ends through openings in brackets 88 on the main frame and retaining this rod in place on these brackets by means of screw nuts 89, as shown in Figs. 1, 3 and 7.

The dust laden air is blown by the fan into the manifold chamber 84 and distributed from the latter into the several separating tubes and under the pressure of this fan the air passes through the fine mesh of the screenlike material of the manifold and separating tubes to the outer atmosphere while the dust is separated therefrom and retained on the inner side of the manifold and separating tubes. After the dust forms a coating on the inner side of the separating tubes the same drops therefrom into the manifold and is removed from the latter at suitable intervals through an outlet opening in the bottom thereof which is normally closed by a sliding closure 90 or other suitable means for controlling this outlet.

By arranging the dust separator and collector in the machine below the cutting mechanism, a very compact organization is produced which can be readily transported and installed as a complete unit.

If desired, part of the suction chamber may be mounted on the main frame and part of the cutter rock lever, this being accomplished in the construction shown in Fig. 11 by forming the top of the suction chamber by two horizontal sections 91 which are connected with opposite longitudinal edges of the cutter rock lever 37 and move vertically therewith between two stationary side walls 92 of the suction chamber. A similar construction is shown in Fig. 13 in which the top sections 91 of the suction chamber are connected with the cutter rock lever and are provided at their outer longitudinal edges with depending movable side walls 93 which are arranged close to and move vertically relative to stationary side walls 94 of the suction chamber.

If desired, the greater part of the suction chamber may be carried by the cutter rock lever and lesser part on the main frame, as shown in Fig. 14, in which example the upper part 95 of the suction chamber is comparatively high and connected with the cutter rock lever 96 so as to move vertically therewith relative to the lower stationary part 97 of the suction chamber which is comparatively low and connected with the main frame.

In the form of this invention shown in Figs. 15 and 16, the entire suction chamber 98 is stationary and mounted on the main frame and the entire mechanism for driving the cutting disk and the rock lever for moving the same toward and from the work piece which it to be cut is wholly independent of the suction chamber and completely enclosed thereby on its under side, topside, back side and lateral sides, and only the front side of the suction chamber is open for the reception of the work piece and the means for presenting the work piece to the cutter tool.

The form of dust collecting means embodying this invention, as shown in Figs. 17, 18 and 19 are constructed as follows:

In general the organization of the cutting apparatus and the dust collecting means associated therewith in these figures is the same as that shown in Figs. 1-9, and the description of the latter and reference characters therefore are the same so far as they apply.

The additional feature in the apparatus shown in Figs. 17-19 consists of means associated with the cutting device and the suction chamber to increasingly cover the passage at the front of the suction chamber as the cutting device moves toward the article which is to be cut and increasingly uncovers this passage as the cutting device moves away from said article, and thereby produces a relatively light suction effect on the dust laden air during the initial part of a cut when only a small amount of dust is produced, and a comparatively heavy suction effect on the dust laden air during the later and deeper or final part of the cut when a greater amount of dust is produced and thus insures effective carrying away of the dust during the entire cutting operation.

The preferred means for accomplishing this purpose which are shown in Figs. 17-19 comprise two closure members, shutters or wings 99 which project laterally from opposite sides of the front part of the cutter enclosing hood 67, 69 so as to move vertically with the cutting device and its rocking support, which closure wings extend across the upper part of the front passage of the suction chamber, so that when the cutting device is in its highest position these closure members uncover this front passage to the maximum extent, and when the cutting device is lowered more or less the closure members cover said passage to a greater extent, thereby varying the size of this passage accordingly and reducing the intensity of the suction effect when the cutting device is raised and increasing this effect when this device is lowered.

In order to form a substantially tight joint between the closure wings 99 and the walls of the suction chamber with which the same cooperate, these closure members extend at their outer edges horizontally across the front edges of the vertical side walls 63 of the suction chamber and are provided with flanges 100 which project rearwardly along the outer side of said walls, as best shown in Fig. 19.

For the purpose of maintaining a substantially closed joint between the closure wings 99 and the side walls 63 of the suction chamber in all positions of the cutting mechanism relative to the suction chamber the front edge portion 101 of each of these side walls and the respective closure wings 99 cooperating therewith are curved concentrically with the axis 39 about which the rocking support 35 carrying the cutting device turns as the latter is moved into and out of its operative position, as shown in Fig. 17.

The construction shown in Fig. 14 is also capable of substantially performing the function of the construction shown in Figs. 17, 18 and 19 inasmuch as the vertical movement of the cutting device toward and from the work piece 28 on the carriage 29 will cause the upper wall part 95 of the suction chamber to be moved vertically relative to the lower wall part 97 of this suction chamber, and thus vary the size or capacity of the front passage of the suction chamber through which the air is drawn to carry away the dust formed during the cutting operation.

The several means here shown and described enable the dust produced by tile cutting machines to be disposed of completely and effectively, thus safeguarding the health of the workman and also avoiding objectionable spreading of the dust around the adjacent areas.

I claim:

1. A dust collector for machines whereby tile and like articles are cut and which includes a cutting disk movable bodily toward and from the path of the articles to be cut and a movable carrier whereby said articles are presented to said cutting disk, said collector comprising an enlarged suction chamber adapted to receive the articles and having a closed bottom wall, two closed lateral side walls, a closed rear side wall, a top wall which is provided with an upper passage through which said cutting disk moves vertically, and the front of said chamber being open for the entrance and exit of the carrier whereby the articles are moved to and from the cutting position, exhausting means for withdrawing from said chamber the air which is laden with dust produced by the operation of cutting the articles in said chamber, and hood means for said cutting disk and movable vertically therewith and arranged to cooperate with said top wall to effectively seal said passage.

2. A dust collector for machines whereby tile and like articles are cut and which include a cutting disk movable bodily toward and from the path of the articles to be cut and a movable carrier whereby said articles are presented to said cutting disk, said collector comprising a suction chamber having a closed bottom wall, two closed lateral side walls, a closed rear side wall, a top wall which is provided with an upper passage through which said cutting disk moves vertically, and the front of said chamber being open for the entrance and exit of the carrier whereby the articles are moved to and from the cutting position, exhausting means for withdrawing from said chamber the air which is laden with dust produced by the operation of cutting the articles in said chamber, said bottom being provided with downwardly projecting clearance wells or channels for receiving parts of an adjusting device whereby the articles are adjusted vertically on said carrier.

3. A dust collector for machines whereby tile and like articles are cut and which include a cutting disk movable bodily toward and from the path of the articles to be cut and a movable carrier whereby said articles are presented to said cutting disk, said collector comprising an enlarged suction chamber adapted to receive the articles and having a closed bottom wall, two closed lateral side walls, a closed rear side wall, a top wall which is provided with an upper passage through which said cutting disk moves vertically, and the front of said chamber being open for the entrance and exit of the carrier whereby the articles are moved to and from the cutting position, exhausting means for withdrawing from said chamber the air which is laden with dust produced by the operation of cutting the articles in said chamber, and a hood which is movable vertically with the said cutting disk in the passage of said top and is provided with a top part extending over said cutting disk and vertical shutters on the opposite sides of said top part which move close to opposite edges of said suction chamber top and form a substantially air tight joint therewith.

4. A dust collector for machines whereby tile and like articles are cut and which include a cutting disk movable bodily toward and from the path of the articles to be cut and a movable carrier whereby said articles are presented to said cutting disk, said collector comprising an enlarged suction chamber adapted to receive the articles and having a closed bottom wall, two closed lateral side walls, a closed rear side wall, a top wall which is provided with an upper passage through which said cutting disk moves vertically, and the front of said chamber being open for the entrance and exit of the carrier whereby the articles are moved to and from the cutting position, exhausting means for withdrawing from said chamber the air which is laden with dust produced by the operation of cutting the articles in said chamber, a hood which is movable vertically with said cutting disk in the passage of said top and is provided with a top part extending over said cutting disk and vertical shutters on the opposite side of said top part which move close to opposite edges of said suction chamber top and form a substantially air tight joint therewith, a rock lever pivotally supported adjacent to the upper edge of said rear suction chamber wall and having a front arm carrying said cutting disk and hood and a rear arm projecting rearwardly outside of said suction chamber.

5. In a machine for cutting tile and like articles having a cutting device movable toward and from the path of the articles to be cut, a carrier for presenting said articles to said cutting device and a rock lever on which said cutting device is mounted, the combination therewith of means for pivotally mounting said rock lever comprising a pivot rod connected with said lever, bearing means for journaling said rod including a frame having a notch which receives said rod, a V-saddle mounted on the frame and engaging one side of said rod, a clip engaging the opposite side of said rod, and fastenings connecting said clip with said frame.

6. In a machine for cutting tile and like articles, the combination comprising an enlarged suction chamber adapted to receive the articles and provided on its front side with a front passage through which the article to be cut is moved into and out of said chamber and also provided with a top passage on its upper side, a cutting device movable toward and from the path of the article to be cut, a rocking support movable vertically in the top passage of said chamber and carrying said cutting device, hood means covering said cutting device and arranged on said support to cooperate with said upper side to effectively seal said top passage and closure members which project laterally from opposite sides of said support and are movable vertically across the front passage of the suction chamber, said closure members and the front part of the suction chamber which is traversed by said closure members being curved concentrically with the axis of said support.

CHARLES A. MARTIN.

REFERENCES CITED

The following references are of record in the file of this patent:

UNITED STATES PATENTS

| Number | Name | Date |
|---|---|---|
| 790,943 | Weber | May 30, 1905 |
| 799,641 | Fox | Sept. 19, 1905 |
| 1,059,877 | Keighley | Apr. 22, 1913 |
| 1,528,439 | Leiman | Mar. 3, 1925 |
| 2,007,627 | Waters | July 9, 1935 |
| 2,009,859 | Robinson | July 30, 1935 |
| 2,291,550 | Heinicken | July 28, 1942 |
| 2,315,090 | Dreker | Mar. 30, 1943 |
| 2,384,414 | Antrim | Sept. 4, 1945 |
| 2,394,556 | Martin | Feb. 12, 1946 |
| 2,399,239 | Martin | Apr. 30, 1946 |

FOREIGN PATENTS

| Number | Country | Date |
|---|---|---|
| 524,241 | Great Britain | Jan. 25, 1940 |